(12) United States Patent
Morrison

(10) Patent No.: US 7,085,744 B2
(45) Date of Patent: Aug. 1, 2006

(54) METHOD AND SYSTEM FOR CONDUCTING A TRANSACTION OVER A NETWORK

(75) Inventor: Michael C. Morrison, Ben Lomond, CA (US)

(73) Assignee: International Business Machines Corporation, Armonk, NY (US)

(*) Notice: Subject to any disclaimer, the term of this patent is extended or adjusted under 35 U.S.C. 154(b) by 158 days.

(21) Appl. No.: 09/733,494

(22) Filed: Dec. 8, 2000

(65) Prior Publication Data

US 2002/0073047 A1 Jun. 13, 2002

(51) Int. Cl.
*G06Q 99/00* (2006.01)
*H04K 1/00* (2006.01)

(52) U.S. Cl. .............................. 705/71; 705/44; 705/50; 705/52; 705/64; 705/75; 340/5.1; 380/277; 380/286; 713/15; 713/168; 713/171; 713/181

(58) Field of Classification Search ................ 713/171, 713/15–168, 181; 705/71, 44, 50–52, 64, 705/75; 340/5.1; 380/277–286
See application file for complete search history.

(56) References Cited

U.S. PATENT DOCUMENTS

| | | | |
|---|---|---|---|
| 5,532,920 A * | 7/1996 | Hartrick et al. | 715/500 |
| 5,909,545 A | 6/1999 | Frese, II et al. | |
| 5,923,846 A | 7/1999 | Gage et al. | |
| 5,933,498 A * | 8/1999 | Schneck et al. | 705/54 |
| 5,941,947 A | 8/1999 | Brown et al. | |
| 5,956,048 A * | 9/1999 | Gaston | 345/530 |
| 5,963,915 A * | 10/1999 | Kirsch | 705/26 |
| 5,991,399 A * | 11/1999 | Graunke et al. | 380/279 |

(Continued)

FOREIGN PATENT DOCUMENTS

CA 2249138 5/1999

(Continued)

OTHER PUBLICATIONS

Kristol & Montulli, HTTP State Management Mechanism, Feb. 1997, Netwok Working Group, www.ietf.org/rfc/rfc2109.txt.*

(Continued)

*Primary Examiner*—Kambiz Abdi
(74) *Attorney, Agent, or Firm*—Sawyer Law Group LLP

(57) ABSTRACT

A method and system for conducting a transaction over a network is disclosed. The network includes a first system and a second system. The method and system comprise initiating a transaction, comparing a value of the first system with a value of the second system and continuing the transaction based on the comparison. Through the use of the present invention, a client can download for-fee files as often as necessary in spite of potential lost connections. Consequently, the client can download files he or she has paid for with the assurance that he or she will pay just once because payment is not for the content, but for an encryption key that is capable of being utilized by the client system to subsequently decrypt the downloaded file.

33 Claims, 3 Drawing Sheets

U.S. PATENT DOCUMENTS

| | | | |
|---|---|---|---|
| 6,026,474 A | | 2/2000 | Carter et al. |
| 6,047,268 A | * | 4/2000 | Bartoli et al. .................. 705/35 |
| 6,049,892 A | * | 4/2000 | Casagrande et al. .......... 714/18 |
| 6,076,108 A | * | 6/2000 | Courts et al. ............... 709/227 |
| 6,092,105 A | * | 7/2000 | Goldman .................... 709/217 |
| 6,115,040 A | * | 9/2000 | Bladow et al. ............. 345/741 |
| 6,226,750 B1 | * | 5/2001 | Trieger ........................ 713/201 |
| 6,311,269 B1 | * | 10/2001 | Luckenbaugh et al. ..... 713/154 |
| 6,374,359 B1 | * | 4/2002 | Shrader et al. ............. 713/201 |
| 6,473,740 B1 | * | 10/2002 | Cockrill et al. ............... 705/27 |
| 6,496,824 B1 | * | 12/2002 | Wilf ............................ 707/10 |
| 6,813,519 B1 | * | 11/2004 | Lebel et al. ................... 607/32 |
| 2001/0002900 A1 | * | 6/2001 | Romrell ...................... 370/216 |

FOREIGN PATENT DOCUMENTS

| | | |
|---|---|---|
| WO | WO9900960 | 1/1999 |

OTHER PUBLICATIONS

Netscape, Presistent Client State HTTP Cookies, Netscape Communications, Nov. 9, 1999, wp.netscape.com/newsref/std/cookie_spec.html.*

Sih-Pin Subrina Chang et al. A System and Method for Adaptive Delivery of Rich Media Content to a User in a Network Based on Real Time Bandwidth Measurement and Prediction According to Available User Bandwidth. U.S. Appl. No. 08/447,585, filed Nov. 23, 1999.

* cited by examiner

METHOD AND SYSTEM FOR CONDUCTING A TRANSACTION OVER A NETWORK

FIELD OF INVENTION

The present invention relates to the remote execution of computer programs and more particularly to the method and system for conducting a transaction over a network.

BACKGROUND OF THE INVENTION

Computer networking systems such as the Internet are exploding in popularity all over the world. The Internet is a publicly available network of computer networks that spans, not only the United States, but many parts of the world as well. FIG. 1 is an illustration of a typical Internet environment. This environment includes a network 10, such as the Internet, that is connected to a plurality of client computer systems 12, each of the plurality of client computer systems including a display device for displaying information. Also connected to the network 10 is a plurality of server systems 14 that provide information to the network 10.

To access the information on the Internet, a user uses a computer (i.e. client system) coupled to the Internet to access the various server systems via web sites. These web sites include programs which support the physical, data link, network and transport layers necessary for communication among the server systems on the Internet. In this way, computers on a network associated with one server may communicate with a computer associated with another server to conduct various transactions.

One such transaction that occurs on the Internet is the purchase of downloadable files (audio, video, PostScript, PDF, etc.) from a server system by a client utilizing a client system. FIG. 2 is a flowchart of a conventional method of conducting such a transaction over the Internet. First, a client accesses a web site on the Internet, via step 20. Next, the client selects a file to be downloaded, via step 22. The client then makes a payment for the downloadable file, via step 24. Finally, the file is downloaded to the client system, via step 26.

A problem with this approach is that sometimes the files that are being downloaded are large and require a substantial amount of time to complete the download process. Consequently, if the connection to the Internet is unexpectedly lost during the download, the client may have to return to the web site and pay for the file again in order to complete the download process.

Accordingly, a method and system for conducting a transaction over the Internet whereby a client can download for-fee files with the assurance that he or she will pay just once for the file. The method and system should be simple, cost effective and capable of being easily adapted to current technology. The present invention addresses such a need.

SUMMARY OF THE INVENTION

A method and system for conducting a transaction over a network is disclosed. The network includes a first system and a second system. The method and system comprise initiating a transaction, comparing a value of the first system with a value of the second system and continuing the transaction based on the comparison.

Through the use of the present invention, a client can download for-fee files as often as necessary in spite of potential lost connections. Consequently, the client can download files he or she has paid for with the assurance that he or she will pay just once because payment is not for the content, but for an encryption key that is capable of being utilized by the client system to subsequently decrypt the downloaded file.

DETAILED DESCRIPTION OF THE INVENTION

The present invention provides a method and system for conducting a transaction over a network. The following description is presented to enable one of ordinary skill in the art to make and use the invention and is provided in the context of a patent application and its requirements. Although the present invention has been described in the context of being used with the Internet, one of ordinary skill in the art will readily recognize that the present system can be used in conjunction with any type of networking system while remaining within the spirit and scope of the present invention. Accordingly, various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The present invention is present in the context of a preferred embodiment. The preferred embodiment of the present invention is a method and system for conducting a transaction over a network such as the Internet. The method and system in accordance with the present invention insures that if a customer wants to pay for a downloadable file over the Internet, the customer will only have to pay for it once even if the connection to the Internet is somehow lost while the file is being downloaded.

The present invention accomplishes the above noted advantages through the implementation of a server-to-client decryption key. Rather than requiring a client to pay for the downloadable file first and then transferring the file, the present invention allows a client to pay for a decryption key after an encrypted file has been downloaded. Consequently, if the connection to the Internet is lost while the file is being downloaded, the client can return to the web site after reestablishing the connection to the Internet and complete the download of the file without having been charged for the first download attempt.

Figure 1:
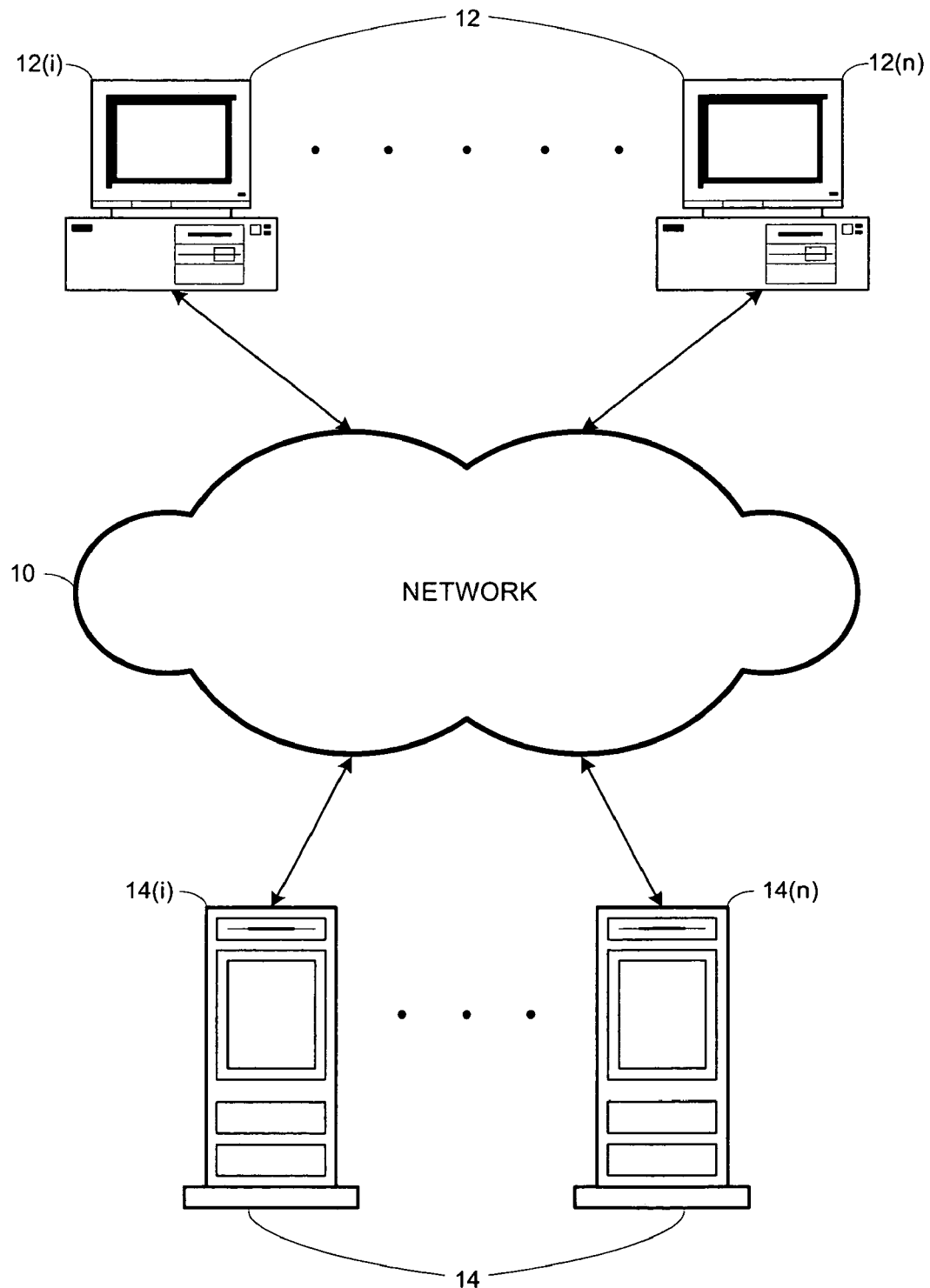
FIG. 1 is an illustration of a typical Internet environment.
Figure 2:
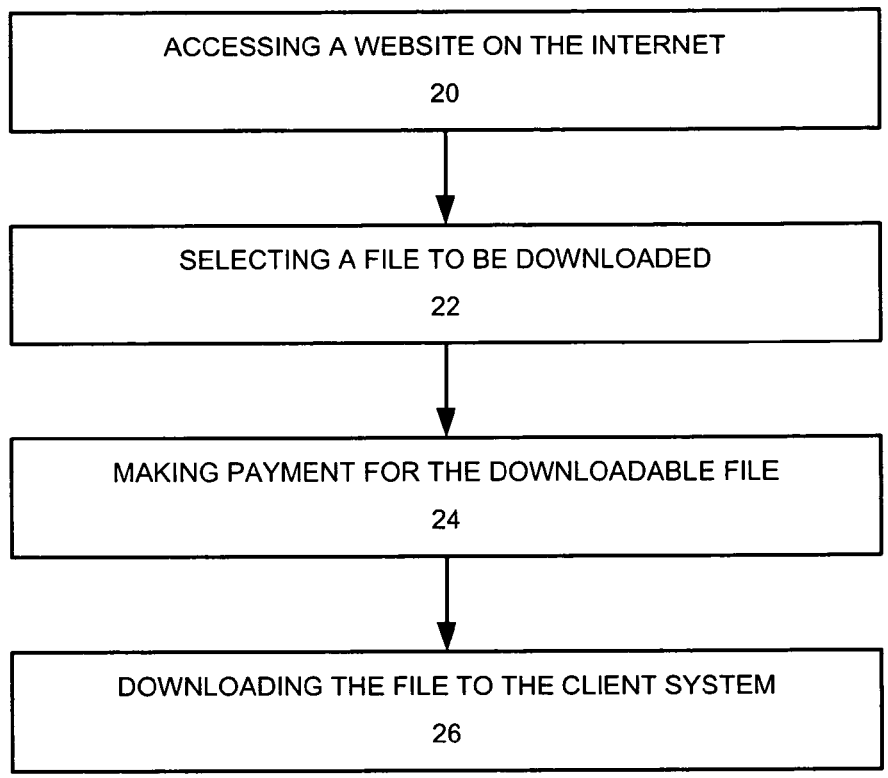
FIG. 2 is a flowchart of a conventional method of conducting a transaction over a network.
Figure 3:
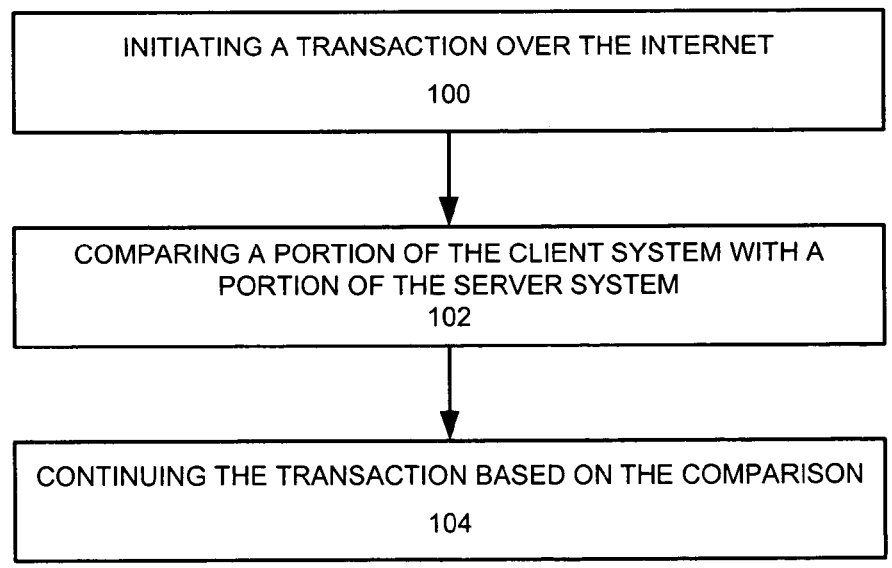
FIG. 3 is a high level flowchart of the method in accordance with the present invention.

For a better understanding of the method in accordance with the present invention, please refer now to FIG. 3. FIG. 3 is a high level flowchart of the method in accordance with the present invention. First, a transaction is initiated over the Internet, via step 100. Preferably this involves a client browsing a particular web site and selecting a file for download. Next, a portion of the client system is compared with a portion of the server system, via step 102. This step preferably involves an instruction to the server system to look for a cookie on the client system. A cookie comprises data created by a server system that is stored on a client's computer in a persistent data file. It provides a way for the server system to keep track of a client's patterns and preferences and store them on the client's own system. Finally, the transaction is continued based on the comparison, via step 104.

If a cookie exists, based on step 102, this represents a returning client. The server system then compares a value in the cookie with a value in its database. If the values do not match, or if there was no cookie, the server system generates a DES-based encryption key, the encryption key preferably comprising not less than 56 bits and no more than 256 bits of data, for the download session. This "session" key is used for the duration of the transaction with the client. A session key is reused only if the current transaction is still in-flight (i.e. the transaction was previously started and not completed). The server system then instructs the browser to create a cookie on the client system and store half (the high 128 bits) of the session key in the cookie. The server system also stores the entire session key in its database in a record that corresponds to the current client. The server system then uses the full session key to encrypt all the files that the client selects for downloading. At this point, the client can download the encrypted files.

If the download fails during the transaction, the client can return to the server web site page and reselect the failed file. However, this time the server system will find a cookie on the client system and the comparison of the value in the cookie with a value in the server database will yield a match. Accordingly, if the value in the server database matches the value in the cookie, this represents the condition wherein the client either wants to download more files as part of the same transaction, or wants to retry a download that had previously failed. For either case, the transaction is still in-flight and not yet complete. That is, the client has not yet paid the provider for the files he or she has downloaded, nor can the client use the files because he or she does not have the full session key with which to decrypt the files. The server system then encrypts the selected files using the current session key and the client downloads the files.

When the client has completed downloading all selected files, and wants to complete the transaction, he or she fills in a form with the appropriate information, and-submits it to the server system. After verifying payment information, the server system instructs the client to download the full session key to the same directory where he or she downloaded the other files. The server system also stores the full session key in the cookie on the client machine. This completes the transaction.

Because the session key preferably comprises no more than 256 bits of data, it is capable of being downloaded quickly thereby greatly increasing the odds that it will be successfully downloaded prior to any unexpected disconnection from the Internet. If it does fail, the client can request the session-key file again as long as he or she does not begin a new transaction by selecting new files to download. The server system allows the client to re-download the session-key file because the full session key is still in the cookie.

When the client has the full session key, he or she can use a decryption tool from the content provider (either as a separate tool or as part of the reader for the files downloaded) to decrypt the files. This tool uses the downloaded file and the session-key file as input. If the client attempts to use a different key file, the files will be decrypted incorrectly.

Figure 4:
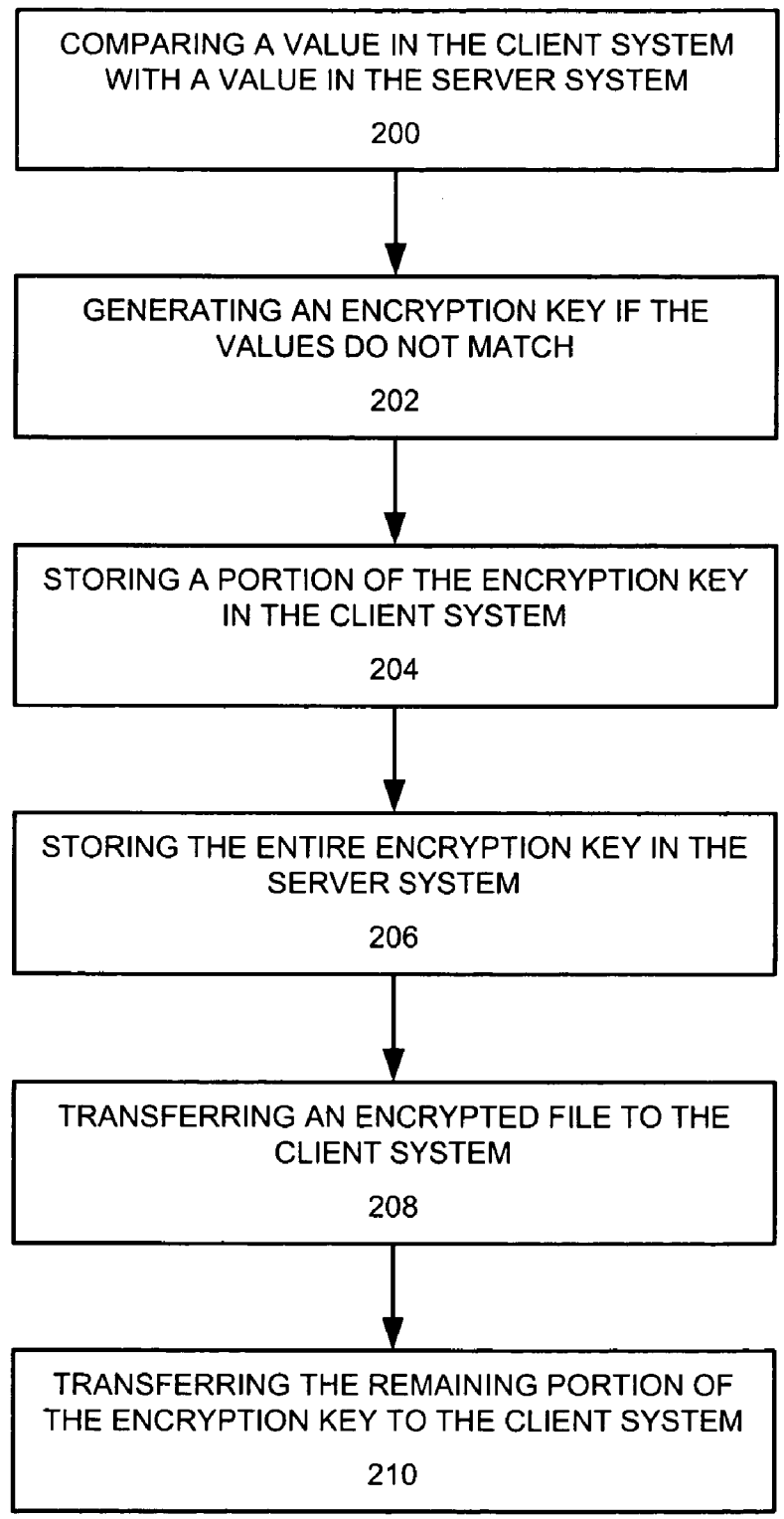
FIG. 4 is a more detailed flowchart of the method in accordance with the present invention.

For a more detailed description of the method in accordance with the present invention, please refer now to FIG. 4. FIG. 4 is a more detailed flowchart of the method in accordance with the present invention. Once the client initiates the transaction, the server system compares a value in the client system with a value in the server system, via step 200. This step preferably involves the comparison of a value in the cookie with a value in the server database. If the value in the cookie does not match the value in the server system or a cookie doesn't exist, the server system generates an encryption key, via step 202. Preferably, the encryption key is not less than 56 bits and no more than 256 bits of data. Next, a portion of the encryption key is stored in the client system, via step 204. The portion of the encryption key is preferably stored in a cookie on the client system.

Next, the entire encryption key is stored in the server system, via step 206. The server system then transfers an encrypted file to the client system, via step 208. After the encrypted file has been transferred, the remaining portion of the encryption key is transferred to the client system, via step 210. The encryption key is capable of being utilized by the client system to subsequently decrypt the encrypted file. Preferably, step 210 is performed in response to a payment transaction that takes place from the client system to the server system.

Going back to step 200, if the value in the client system matches the value in the server system, the method proceeds to step 208 wherein the server system then transfers an encrypted file to the client system based on a request from the client system. However in this case, the client either wants to download more files as part of the same transaction, or wants to retry a download that had previously failed. In either case, after the encrypted file(s) has been transferred, the remaining portion of the encryption key is transferred to the client system whereby the encryption key is capable of being utilized by the client system to subsequently decrypt the encrypted file(s).

Because the server system uses a client-side cookie to retain information about the state of the transaction ("values do not match" means transaction not started, "values match" means transaction in progress) the present invention defines a transaction by how the client views it: started when he or she selects files and complete when he or she has the session key to decrypt and use the files. Thus, the customer can download for-fee files as often as necessary in spite of potential lost connections. Consequently, the customer can download files he or she has paid for with the assurance that he or she will pay just once because payment is not for the content, but for the key (pricing can be based on the content, but the payment is actually for the session key).

Such a method may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform a method for booting up a computer system in a secure fashion.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for conducting a transaction between a first computer system and a second computer system, the method comprising the steps of:
 (a) receiving in the second computer system a request from a user of the first computer system to download data from the second computer system, the data to be encrypted with an encryption key prior to being downloaded;
 (b) determining by the second computer system whether the request represents a new transaction or an incomplete transaction by comparing a first value stored in the first computer system with a part of a second value stored in the second system, the first value being a portion of the encryption key, the second value being a whole portion of the encryption key; and
 (c) if wherein the request represents an incomplete transaction indicated by the portion of the encryption key stored in the first computer not matching any part of the whole portion of the encryption key stored in the second computer, and completing the incomplete transaction, wherein the user is not charged duplicate fees associated with starting a new transaction completing the incomplete transaction.

2. The method of claim 1 wherein the first system comprises a client system and the second system comprises a server system.

3. The method of claim 2 wherein the first value of the client system is stored in a persistent client-side data file.

4. The method of claim 3 wherein the persistent client-side data file comprises a cookie.

5. The method of claim 4 wherein step b) further comprises:
 b1) allowing the server system to compare the first value in the cookie with a part of the second value in the server system.

6. The method of claim 1, wherein the request represents a new transaction if the first value does not match a part of the second value, the method further comprising:
 d) if the request represents a new transaction, generating a new encryption key by the second system, wherein the new encryption key is associated with the new transaction;
 e) storing a first portion of the new encryption key in the first computer system as the first value; and
 f) storing the whole new encryption key on the second computer system as the second value.

7. The method of claim 6 further comprising:
 g) encrypting the requested data with the whole new encryption key;
 h) transmitting the encrypted data from the second computer system to the first computer system; and
 i) after the encrypted data has been transmitted, sending a remaining portion of the new encryption key from the second computer system to the first computer system, wherein the first computer system combines the first portion and the remaining portion of the new encryption key to form the whole new encryption key and utilizes the whole new encryption key to decrypt the encrypted data.

8. The method of claim 7 further comprising:
 j) after the encrypted data has been transmitted and prior to sending the remaining portion of the new encryption key, allowing the user to provide payment for the whole new encryption key.

9. The method of claim 1, wherein the first value is a first portion of an encryption key and the second value is a whole encryption key, and step c) further comprises:
 c1) encrypting the requested data with the whole encryption key;
 c2) transmitting the encrypted data from the second computer system to the first computer system; and
 c3) after the encrypted data has been transmitted, sending a remaining portion of the encryption key from the second computer system to the first computer system, whereby the first computer system combines the first portion and the remaining portion of the encryption key to form the whole encryption key and utilizes the whole encryption key to decrypt the encrypted data.

10. The method of claim 9, wherein step (c) further comprises:
 c4) after the encrypted data has been transmitted and prior to sending the remaining portion of the encryption key, allowing the user to provide payment for the whole encryption key.

11. A system for conducting a transaction between a first computer system and a second computer system, the system comprising:
 means in the second computer system for receiving a request from a user of the first computer system to download data from the second computer system, the data to be encrypted with an encryption key prior to being downloaded;
 means for determining by the second computer system whether the request represents a new transaction or an incomplete transaction by comparing a first value stored in the first computer system with a cart of a second value stored in the second system, the first value being a portion of the encryption key, the second value being a whole portion of the encryption key; and
 means for completing the incomplete transaction if the request represents an incomplete transaction, the incomplete transaction being indicated by the portion of the encryption key stored in the first computer not matching any part of the whole portion of the encryption key stored in the second computer,
 wherein the user is not charged duplicate fees associated with starting a new transaction completing the incomplete transaction.

12. The system of claim 11 wherein the first system comprises a client system and the second system comprises a server system.

13. The system of claim 12 wherein the first value of the client system is stored in a persistent client-side data file.

14. The system of claim 13 wherein the persistent client-side data file comprises a cookie.

15. The system of claim 14 wherein the means for determining further comprises:

means for allowing the server system to compare the first value in the cookie with a part of the second value in the server system.

16. The system of claim 11 wherein the request represents a new transaction if the first value does not match a part of the second value and wherein the system further comprises:

means in the second system for generating a new encryption key, wherein the new encryption key is associated with the new transaction;

means in the second system for storing a first portion of the new encryption key in the first computer system as the first value; and means in the second system for storing the whole new encryption key on the second computer system as the second value.

17. The system of claim 16 further comprising:

means for encrypting the requested data with the whole new encryption key;

means in the second computer system for transmitting the encrypted data from the second computer system to the first computer system; and means in the second computer system for sending a remaining portion of the new encryption key from the second computer system to the first computer system, whereby the first computer system combines the first portion and the remaining portion of the new encryption key to form the whole new encryption key and utilizes the whole new encryption key to decrypt the encrypted data.

18. The system of claim 17 further comprising:

means for allowing the user to provide payment for the whole new encryption key after the encrypted data has been transmitted and prior to sending the remaining portion of the new encryption key.

19. The system of claim 11, wherein the first value is a first portion of an encryption key and the second value is a whole encryption key, and the means for completing the incomplete transaction comprises:

means for encrypting the requested data with the whole encryption key;

means in the second computer system for transmitting the encrypted data from the second computer system to the first computer system; and means in the second computer system for sending a remaining portion of the encryption key from the second computer system to the first computer system, whereby the first computer system combines the first portion and the remaining portion of the encryption key to form the whole encryption key and utilizes the whole encryption key to decrypt the encrypted information.

20. The system of claim 19 wherein the means for completing the incomplete transaction further includes means for allowing the user to provide payment for the whole encryption key after the encrypted data has been transmitted and prior to sending the remaining portion of the encryption key.

21. A computer readable medium containing program instructions for conducting a transaction between a first computer system and a second computer system, the program instructions for:

(a) receiving in the second computer system a request from a user of the first computer system to download data from the second computer system, the data to be encrypted with an encryption key prior to being downloaded;

(b) determining by the second computer system whether the request represents a new transaction or an incomplete transaction by comparing a first value stored in the first computer system with a part of a second value stored in the second system, the first value being a portion of the encryption key, the second value being a whole portion of the encryption key; and (c) if wherein the request represents an incomplete transaction indicated by the portion of the encryption key stored in the first computer not matching any part of the whole portion of the encryption key stored in the second computer, and completing the incomplete transaction, wherein the user is not charged duplicate fees associated with starting a new transaction completing the incomplete transaction.

22. The computer readable medium of claim 21 wherein the first system comprises a client system and the second system comprises a server system.

23. The computer readable medium of claim 22 wherein the first value of the client system is stored in a persistent client-side data file.

24. The computer readable medium of claim 23 wherein the persistent client-side data file comprises a cookie.

25. The computer readable medium of claim 24 wherein instruction b) further comprises:

b1) allowing the server system to compare the first value in the cookie with a part of the second value in the server system.

26. The computer readable medium of claim 21, wherein the request represents a new transaction if the first value does not match a part of the second value, the method further comprising:

d) if the request represents a new transaction, generating a new encryption key by the second system, wherein the new encryption key is associated with the new transaction;

e) storing a first portion of the new encryption key in the first computer system as the first value; and f) storing the whole new encryption key on the second computer system as the second value.

27. The computer readable medium of claim 26 further comprising:

g) encrypting the requested data with the whole new encryption key;

h) transmitting the encrypted data from the second computer system to the first computer system; and i) after the encrypted data has been transmitted, sending a remaining portion of the new encryption key from the second computer system to the first computer system, wherein the first computer system combines the first portion and the remaining portion of the new encryption key to form the whole new encryption key and utilizes the whole new encryption key to decrypt the encrypted data.

28. The computer readable medium of claim 27 further comprising:

j) after the encrypted data has been transmitted and prior to sending the remaining portion of the new encryption key, allowing the user to provide payment for the whole new encryption key.

29. The computer readable medium of claim 21 wherein the first value is a first portion of an encryption key and the second value is a whole encryption key, and instruction c) further comprises:

c1) encrypting the requested data with the whole encryption key;

c2) transmitting the encrypted data from the second computer system to the first computer system; and c3) after the encrypted data has been transmitted, sending a remaining portion of the encryption key from the second computer system to the first computer system, whereby the first computer system combines the first portion and the remaining portion of the encryption key to form the whole encryption key and utilizes the whole encryption key to decrypt the encrypted data.

30. The computer readable medium of claim 29, wherein instruction (c) further comprises:

c4) after the encrypted data has been transmitted and prior to sending the remaining portion of the encryption key, allowing the user to provide payment for the whole encryption key.

31. A method for conducting a transaction between a first computer system and a second computer system, the method comprising the steps of:

(a) receiving in the second computer system a request from a user of the first computer system to download data from the second computer system;

(b) determining by the second computer system whether the request represents a new transaction or an incomplete transaction by comparing a first value stored in the first computer system with a part of a second value stored in the second system; and (c) if the request represents an incomplete transaction, completing the incomplete transaction, wherein the user is not charged duplicate fees associated with starting a new transaction completing the incomplete transaction;

wherein the first value is a first portion of an encryption key and the second value is a whole encryption key, and step c) further comprises:

c1) encrypting the requested data with the whole encryption key;

c2) transmitting the encrypted data from the second computer system to the first computer system; and c3) after the encrypted data has been transmitted, sending a remaining portion of the encryption key from the second computer system to the first computer system, whereby the first computer system combines the first portion and the remaining portion of the encryption key to form the whole encryption key and utilizes the whole encryption key to decrypt the encrypted data.

32. A system for conducting a transaction between a first computer system and a second computer system, the system comprising:

means in the second computer system for receiving a request from a user of the first computer system to download data from the second computer system;

means for determining by the second computer system whether the request represents a new transaction or an incomplete transaction by comparing a first value stored in the first computer system with a part of a second value stored in the second system; and means for completing the incomplete transaction if the request represents an incomplete transaction, wherein the user is not charged duplicate fees associated with starting a new transaction completing the incomplete transaction;

wherein the first value is a first portion of an encryption key and the second value is a whole encryption key, and the means for completing the incomplete transaction comprises:

means for encrypting the requested data with the whole encryption key;

means in the second computer system for transmitting the encrypted data from the second computer system to the first computer system; and means in the second computer system for sending a remaining portion of the encryption key from the second computer system to the first computer system, whereby the first computer system combines the first portion and the remaining portion of the encryption key to form the whole encryption key and utilizes the whole encryption key to decrypt the encrypted information.

33. A computer readable medium containing program instructions for conducting a transaction between a first computer system and a second computer system, the program instructions for:

(a) receiving in the second computer system a request from a user of the first computer system to download data from the second computer system;

(b) determining by the second computer system whether the request represents a new transaction or an incomplete transaction by comparing a first value stored in the first computer system with a part of a second value stored in the second system; and (c) if the request represents an incomplete transaction, completing the incomplete transaction, wherein the user is not charged duplicate fees associated with starting a new transaction completing the incomplete transaction;

wherein the first value is a first portion of an encryption key and the second value is a whole encryption key, and instruction c) further comprises:

c1) encrypting the requested data with the whole encryption key;

c2) transmitting the encrypted data from the second computer system to the first computer system; and c3) after the encrypted data has been transmitted, sending a remaining portion of the encryption key from the second computer system to the first computer system, whereby the first computer system combines the first portion and the remaining portion of the encryption key to form the whole encryption key and utilizes the whole encryption key to decrypt the encrypted data.

* * * * *

UNITED STATES PATENT AND TRADEMARK OFFICE
CERTIFICATE OF CORRECTION

PATENT NO. : 7,085,744 B2  Page 1 of 1
APPLICATION NO. : 09/733494
DATED : August 1, 2006
INVENTOR(S) : Michael C. Morrison It is certified that error appears in the above-identified patent and that said Letters Patent is hereby corrected as shown below:

In column 6, line 45, replace "cart" and add --part--.

Signed and Sealed this

Seventeenth Day of October, 2006

JON W. DUDAS
*Director of the United States Patent and Trademark Office*